April 29, 1930.   H. W. BEACH   1,756,806
PORTABLE AIR COMPRESSING UNIT
Filed Oct. 28, 1927   2 Sheets-Sheet 1
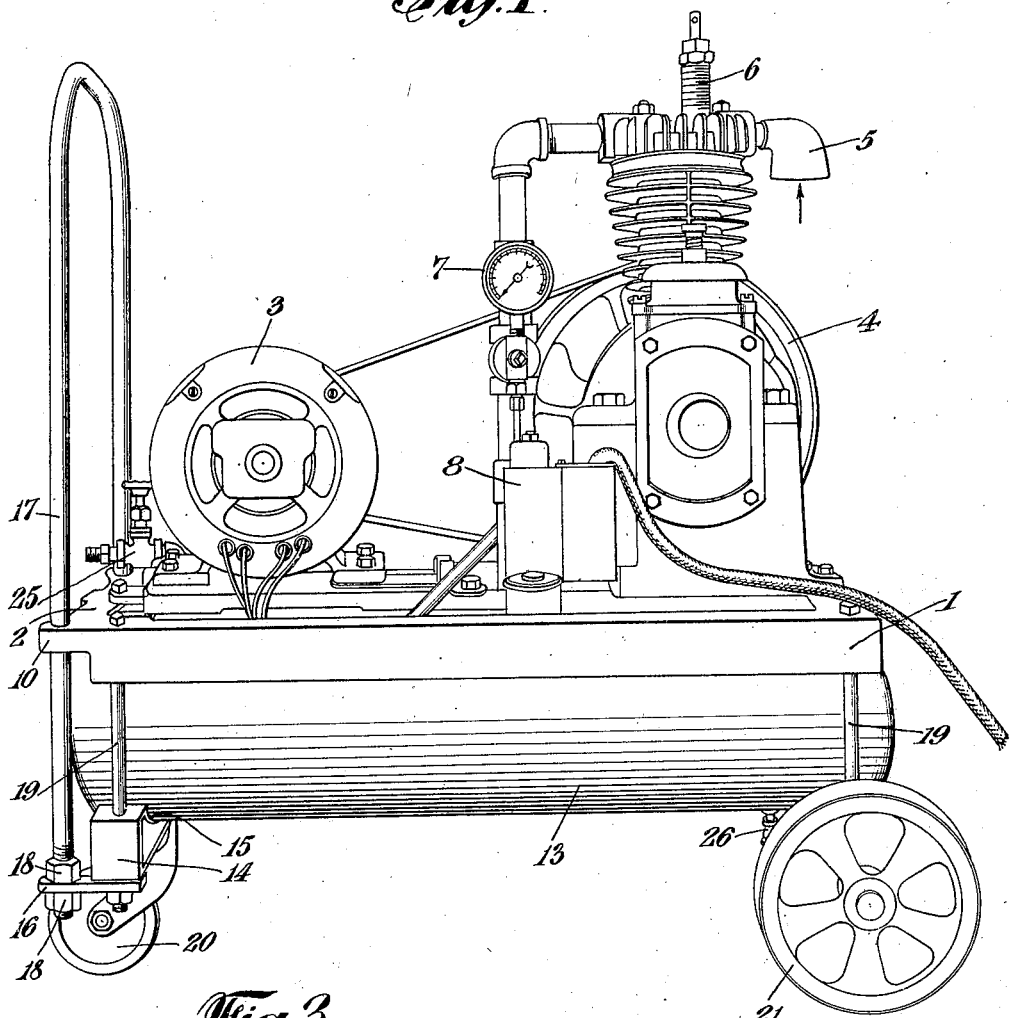

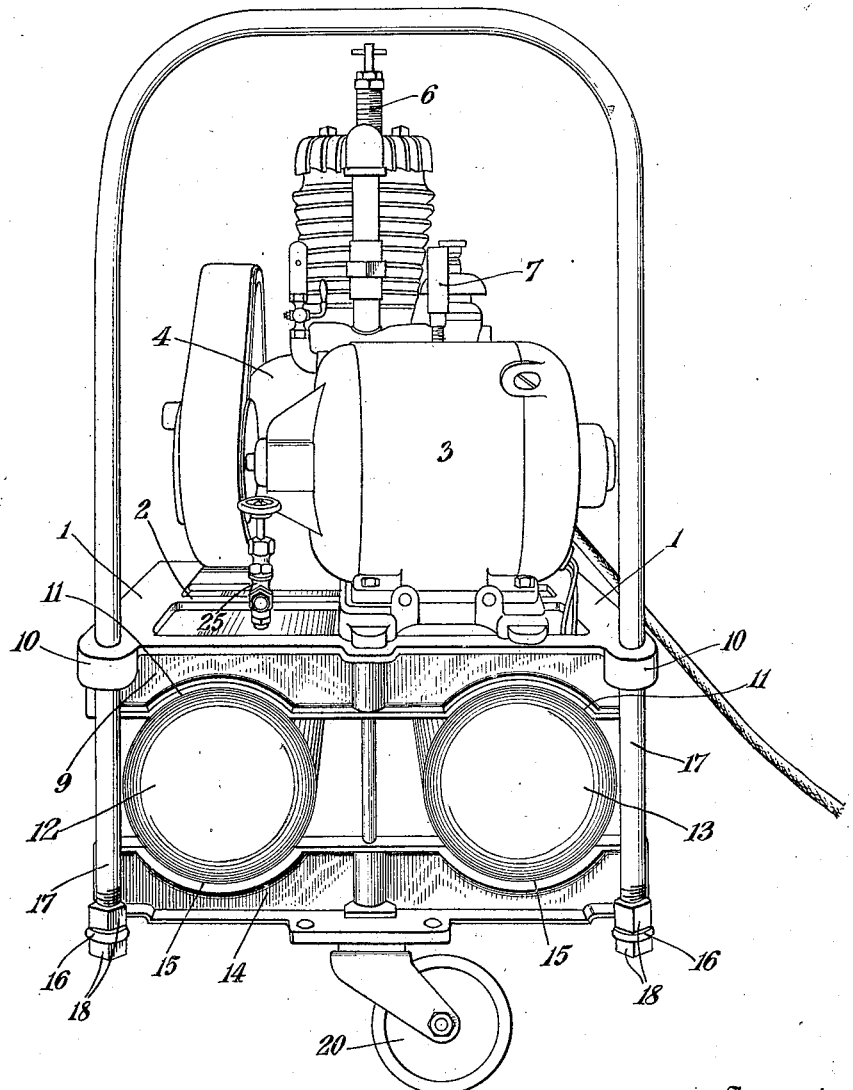

Patented Apr. 29, 1930

1,756,806

UNITED STATES PATENT OFFICE

HOWARD W. BEACH, OF CALDWELL, NEW JERSEY

PORTABLE AIR-COMPRESSING UNIT

Application filed October 28, 1927. Serial No. 229,311.

This invention relates to improvements in portable air compressing units and has for its principal object the provision of an apparatus of that character in which all of the parts are mounted upon a truck or similar vehicle within a minimum space, and including a plurality of pressure tanks, one of which will serve as a cooling and settling chamber.

A further object of this invention is the provision of such an apparatus which is composed of few parts, may be readily and cheaply manufactured and assembled, which is strong in construction, in which the mechanisms thereon may be readily and quickly mounted in proper alignment, and which is encompassed within a minimum space resulting in economy in shipment charges and cost of manufacture.

Further objects include improvements in details of construction hereinafter pointed out.

To the accomplishment of the foregoing and such other objects as may hereinafter appear, this invention consists in the construction, combination and arrangement of parts hereinafter described and then sought to be defined in the appended claims, reference being had to the accompanying drawings, forming a part hereof and which show, merely for the purpose of illustrative disclosure, a preferred embodiment of my invention, it being expressly understood, however, that various changes may be made in practice within the scope of the claims without digressing from my inventive idea.

In the drawings—

Figure 1 represents a side elevation of an apparatus constructed to embody my invention.

Figure 2 is an elevation of one end of the apparatus shown in Figure 1.

Figure 3 is a detail view showing the mounting of the pressure tanks and the connection for the inlet and discharge of the air or other fluid under compression.

This apparatus is designed for use wherever it is necessary or desirable to use fluid pressure such as compressed air in the operation of tools of various kinds and also paint spraying, sand blasting and numerous other operations, and where it is desirable to have a portable compressor unit which may be readily operated from any suitable source of power such as electricity, and which is small, easily handled and readily moved from place to place and entirely self-contained.

In the drawings this apparatus is shown in the form of a truck which includes a main frame member 1, this main frame member having a surface area of substantially the full size of the truck and being provided with suitable cross or transverse members 2 to receive and support the apparatus to be mounted thereon, such as the motor 3, the fluid compressor 4 having intake 5, the unloader 6, gauge 7 and automatic pressure control device 8. The main frame member is suitably bored and slotted so that these parts may be quickly and accurately positioned and aligned and held in that position.

The main frame member is also provided or formed with end pieces or members 9, which may be called bolsters, and also with the apertured ears 10. These bolsters or end pieces are cut out or formed with the concave portions 11 to receive the pressure tanks 12 and 13, which are preferably arranged one on each side of the apparatus. These tanks are preferably supported upon the lower or bottom bolster members 14 which are suitably cut out or formed with concave portions 15 to securely receive the tanks. One of these bolster members is also provided or formed with outwardly extending ears 16 adapted to receive the ends of bent rod or handle member 17 which is fastened therein by means of nuts 18. This rod or handle member passes through the apertured lugs 10 and is formed in a loop or U-shape to serve as the means for pushing the apparatus. Of course, it also serves its function in bracing the parts and assists in fixing the dimensions of the device in packing. The two bolsters 9 and 14 at each end are also suitably connected together by rod members 19 on each side thereof. A suitable caster 20 may be mounted on one end of the truck and at the other end a pair of wheels 21 is also provided whereby the apparatus is mounted for ready portability.

Referring particularly to Figure 3, the pipe 22 is connected to the compressor and leads into the pressure tank 13. A suitable pipe or conduit 23 connects the upper part of pressure tank 13 with the upper part of the pressure tank 12 and this last-mentioned tank has outlet pipe 24 controlled by a valve construction 25 (see Figures 1 and 2), by which the discharge of the compressed fluid is controlled. Each of the pressure tanks 12 and 13 is provided with a drain cock 26.

The pressure tank 13 is connected directly to the fluid compressor itself and, therefore, serves as a cooling and settling chamber so that the air which is passed to and from or stored in the pressure tank 12 is clean and cool, which is a very desirable feature in an apparatus of this kind, especially when used for spraying paint.

It is especially to be noted in an apparatus constructed to embody my invention that the truck supports the operating mechanisms including the compressor, the motor and the automatic control on top in an accessible position and within a minimum space. Furthermore, the pressure tanks, which are comparatively large and unwieldy and take up a lot of space, are positioned beneath the floor of the truck out of the way. Furthermore, they extend for the full length of the truck and, therefore, may be correspondingly reduced in diameter depending upon the pressure requirements. On account of this the use of a large separate tank or large tanks on top of the truck is unnecessary. This results in the material decrease in the dimensions of the apparatus over all and a decided increase in its availability for use in small places, small plants and factories where space is at its minimum and, furthermore, results in providing a device which may be easily crated and shipped cheaply, which is an important factor especially in export business. The construction is low hung but sufficient storage capacity for the compressed fluid is provided to insure efficient operation.

What I claim is:—

1. In a portable fluid compressing unit, the combination of a main frame member, a compressor thereon, a plurality of pressure tanks located beneath said main frame member, bolster members at each end supporting said tank members from below, and a connection between one tank and said compressor whereby that tank serves as a cooling and settling chamber, a connection between the cooling and settling chamber and the other tank and a discharge connection from said other tank.

2. In a portable fluid compressing unit, the combination of a main frame member, a compressor thereon, a pair of pressure tanks mounted beneath said main frame member and extending longitudinally thereof, a bolster member at each end supporting said tank members from below, a connection from the compressor to one tank, a connection from said tank to the other tank, said second tank having a discharge connection.

3. In a portable fluid compressing unit, the combination of a main frame member, a compressor thereon, a bolster member depending from each end of the frame member, a pair of pressure tanks positioned beneath said main frame member, one on each side thereof, and extending longitudinally thereof, said bolster members resting upon said tanks, a bolster member at each end supporting said tanks from below, said bolster member being formed so as to fit a portion of the outer surface of said tanks, means connecting said main frame member and said last-mentioned bolster members together, a conduit adapted to connect one of said tanks to the compressor, a conduit between the two tanks, and a discharge conduit from the other of said tanks, and wheels under said last-mentioned bolster members.

4. In a self-contained portable fluid compressing unit, the combination of a main frame member adapted to receive a motor and a compressor thereon, said main frame member being provided with a bolster at each end, a pair of tanks positioned beneath said main frame member and said bolsters resting upon said tanks, lower bolsters supporting said tanks from the bottom, and means for connecting said lower bolsters to said main frame, and wheels connected to said lower bolsters.

5. In a portable truck for a self-contained portable fluid compressing unit, the combination of a main frame member, a pair of pressure tanks located beneath said main frame member, a bolster member at each end supporting said tanks from below, means connecting said bolster members to said main frame member, wheels for portably supporting said bolster members and a U-shaped handle member at one end of the main frame and connected to said main frame member and one of said bolster members.

6. In a portable truck for a self-contained portable fluid compressing unit, the combination of a one-piece main frame member constructed to provide seats for a motor and a compressor thereon, a bolster member depending from each end of the frame member, a pair of tanks, one mounted on each side of said truck beneath said main frame member, said bolsters resting upon said tanks, a lower bolster at each end upon which said tanks rest and are supported, means for connecting said main frame member and said lower bolsters and wheels connected to said lower bolsters for portability.

7. In a portable truck for a self-contained portable fluid compressing unit, the combination of a one-piece main frame member constructed to provide seats for a motor and a compressor thereon, said main frame member being formed with apertured ears at one end, a bolster member depending from each end of the frame member, a pair of tanks, one mounted on each side of said truck beneath said main frame member, said bolsters resting upon said tanks and being formed with a concave portion to fit the upper surface of said tanks, a lower bolster at each end upon which said tanks rest and are supported, said lower bolsters also being provided with concave portions to fit the lower portion of said tanks, means for connecting said main frame member and said lower bolsters, wheels connected to said lower bolsters for portability, and a U-shaped handle member at one end of said member passing through said apertured ears and connected to one of said lower bolster members.

In testimony that I claim the foregoing, I have hereunto set my hand this 14th day of October, 1927.

HOWARD W. BEACH.